(12) United States Patent
Lin et al.

(10) Patent No.: US 11,812,530 B2
(45) Date of Patent: Nov. 7, 2023

(54) ILLUMINATING SYSTEM AND LUMINANCE ADJUSTING METHOD THEREOF

(71) Applicant: XIAMEN LEEDARSON LIGHTING CO., LTD, Fujian (CN)

(72) Inventors: Qiqiang Lin, Fujian (CN); Hemu Ye, Fujian (CN); Yibin Chen, Fujian (CN); Wei Liu, Fujian (CN); Yongqiang Wu, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 398 days.

(21) Appl. No.: 17/086,326

(22) Filed: Oct. 30, 2020

(65) Prior Publication Data
US 2021/0381681 A1   Dec. 9, 2021

(30) Foreign Application Priority Data

Jun. 5, 2020   (CN) .......................... 202010503675.3

(51) Int. Cl.
*H05B 45/37* (2020.01)
*H05B 47/155* (2020.01)
*H05B 45/10* (2020.01)
*H05B 45/345* (2020.01)

(52) U.S. Cl.
CPC ............. *H05B 45/37* (2020.01); *H05B 45/10* (2020.01); *H05B 45/345* (2020.01); *H05B 47/155* (2020.01)

(58) Field of Classification Search
CPC ...... H05B 47/155; H05B 47/11; H05B 47/10; H05B 45/10; H05B 45/345; H05B 45/37; H05B 45/325; H05B 45/32; H05B 45/00
See application file for complete search history.

(56) References Cited

U.S. PATENT DOCUMENTS

2012/0200230 A1* 8/2012 Esaki ..................... H05B 45/12
   315/200 R
2016/0374177 A1* 12/2016 Chen ................... G06F 3/04883

\* cited by examiner

*Primary Examiner* — Anne M Hines
(74) *Attorney, Agent, or Firm* — Chun-Ming Shih; LANWAY IPR SERVICES (57) ABSTRACT

An illuminating system includes a power source, an on/off switch, an examining module, an illuminating module and a master module. The power source supplies power. The on/off switch switches on or switches off the power from the power source. The examining module detects whether the on/off switch is switched off and whether the on/off switch's switched-off state lasts over a predetermined time interval. In addition, the examining module generates an adjust signal corresponding to a result of detecting the on/off switch. The illuminating module includes a plurality of illuminating elements. The master module adjusts a total current forwarded to and current ratios among the plurality of illuminating elements according to the adjust signal.

20 Claims, 9 Drawing Sheets

ILLUMINATING SYSTEM AND LUMINANCE ADJUSTING METHOD THEREOF

FIELD

The present invention relates to an illuminating system and a luminance adjusting method applied on the illuminating system, and more particularly, to an illuminating system and a luminance adjusting method that merely prompts several flips on a simple on/off switch to adjust the illuminating system's luminance and color temperature.

BACKGROUND

When a user intends to control an indoor luminance, he or she flips on or off a conventional light switch, which is ordinarily installed on a wall, for controlling only a conventional illuminating device's on/off state. However, such control mechanism for the conventional light switch also disables the user from adjusting luminance other than merely an on/off state.

SUMMARY

The present disclosure aims at disclosing an illuminating system that includes a power source, an on/off switch, an examining module, an illuminating module and a master module. The power source supplies power. The on/off switch is electrically coupled to the power source. Also, the on/off switch switches on or switches off the power from the power source. The examining module is electrically coupled to the on/off switch. Besides, the examining module detects whether the on/off switch is switched off and whether the on/off switch's switched-off state lasts over a predetermined time interval. In addition, the examining module generates an adjust signal corresponding to a result of detecting the on/off switch. The illuminating module includes a plurality of illuminating elements. The master module is electrically coupled to the on/off switch, the examining module and the plurality of illuminating elements. And the master module adjusts a total current forwarded to and current ratios among the plurality of illuminating elements according to the adjust signal.

In one example, the illuminating system additionally includes a rectifier and a power stabilizer. The rectifier is electrically coupled to the on/off switch and the master module. Moreover, the rectifier rectifies the power from the power source. The power stabilizer is electrically coupled to the examining module, the master module and the examining module. Additionally, the power stabilizer stabilizes a rectified power from the rectifier for stably powering up the master module and the examining module.

In one example, the power stabilizer includes a switch power chip, a third diode, a fourth diode, a fifth diode, a second stabilizing capacitor, a third stabilizing capacitor, a sixth capacitor, and a third inductor. The third diode has a positive terminal electrically coupled to the master module. Also, the third diode has a negative terminal electrically coupled to the power chip's enable terminal. The fourth diode has a negative terminal electrically coupled to the power chip's power terminal. In addition, the fourth diode has a positive terminal electrically coupled to the examining module. The fifth diode has a negative terminal electrically coupled to the power chip's ground terminal, and has a positive terminal electrically coupled to ground. The second stabilizing capacitor has a first terminal coupled to the third diode's negative terminal, and has a second terminal electrically coupled to the fifth diode's positive terminal. The third stabilizing capacitor has a first terminal electrically coupled to the fourth diode's positive terminal, and has a second terminal electrically coupled to the fifth diode's positive terminal. The sixth capacitor has a first terminal electrically coupled to the fourth diode's negative terminal, and has a second terminal electrically coupled to the fifth diode's negative terminal. The third inductor has a first terminal electrically coupled to the fifth diode's negative terminal, and has a second terminal electrically coupled to the fourth diode's positive terminal.

In one example, the power stabilizer further includes a twelfth resistor, a thirteenth resistor and a fourteenth resistor. The twelfth resistor has a first terminal electrically coupled to the power chip's chip select terminal, and has a second terminal electrically coupled to the fifth diode's negative terminal. The thirteenth resistor is electrically coupled to the twelfth resistor in parallel. The fourteenth resistor is electrically coupled to the third stabilizing capacitor in parallel.

In one example, the master module includes a master chip, a fourth capacitor, a fifth resistor, a sixth resistor, a seventh resistor, and an eighth resistor. The fourth capacitor has a first terminal electrically coupled to the master chip's pulse-width modulation terminal, and has a second terminal electrically coupled to ground. The fifth resistor has a first terminal electrically coupled to the master chip's overvoltage protection terminal, and has a second terminal electrically coupled to the fourth capacitor's second terminal. The sixth resistor is electrically coupled to the fourth capacitor in parallel. The seventh resistor has a first terminal electrically coupled to the master chip's chip select terminal, and has a second terminal electrically coupled to the fourth capacitor's second terminal. The eighth resistor is electrically coupled to the seventh resistor in parallel.

In one example, the master module further includes a first capacitor, a second resistor, a first diode, a second inductor, a third resistor, and a first stabilizing capacitor. The first capacitor has a first terminal electrically coupled to the master chip's enable terminal. The second resistor has a first terminal electrically coupled to the first capacitor's second terminal, and has a second terminal electrically coupled to the power stabilizer. The first diode has a first terminal electrically coupled to the first capacitor's first terminal, and has a second terminal electrically coupled to the second resistor's second terminal. The second inductor has a first terminal electrically coupled to the first capacitor's first terminal, and has a second terminal electrically coupled to the illuminating module. The third resistor has a first terminal electrically coupled to the second inductor's second terminal, and has a second terminal electrically coupled to the first diode's negative terminal. The first stabilizing capacitor is electrically coupled to the third resistor in parallel.

In one example, the master module further includes a first capacitor, a second resistor, a first diode, a third resistor, and a first stabilizing capacitor. The first capacitor has a first terminal electrically coupled to the master chip's enable terminal. The second resistor has a first terminal electrically coupled to the first capacitor's second terminal, and has a second terminal electrically coupled to the power stabilizer. The first diode has a positive terminal electrically coupled to the first capacitor's first terminal, and has a negative terminal electrically coupled to the illuminating module. The third resistor has a first terminal electrically coupled to the first diode's negative terminal, and has a second terminal electrically coupled to the second resistor's second terminal. The first stabilizing capacitor is electrically coupled to the third resistor in parallel.

In one example, the master module further includes a second resistor, a third inductor, a first diode, a third resistor, and a first stabilizing capacitor. The second resistor has a first terminal electrically coupled to the master chip's high voltage terminal, and has a second terminal electrically coupled to the power stabilizer. The third inductor has a first terminal electrically coupled to the master chip's enable terminal, and has a second terminal electrically coupled to the second resistor's second terminal. The first diode has a positive terminal electrically coupled to the third inductor's first terminal. The third resistor has a first terminal electrically coupled to the first diode's negative terminal and the illuminating module, and has a second terminal electrically coupled to the seventh resistor's second terminal. The first stabilizing capacitor is electrically coupled to the third resistor in parallel.

In one example, the examining module includes a second diode, a luminance modulating chip, a tenth resistor, an eleventh resistor, and a fifth capacitor. The second diode has a negative terminal electrically coupled to a reference voltage source. The tenth resistor has a first terminal electrically coupled to the luminance modulating chip's socket terminal, and has a second terminal electrically coupled to the second diode's positive terminal. The eleventh resistor has a first terminal electrically coupled to the rectifier and the second diode's positive terminal, and has a second terminal electrically coupled to ground. The fifth capacitor has a first terminal electrically coupled to the tenth resistor's second terminal, and has a second terminal electrically coupled to the eleventh resistor's second terminal.

In one example, the rectifier includes a rectifying bridge.

In one example, the examining module generates a pulse-width modulation signal upon detecting that the on/off switch's cutoff duration fails to last over the predetermined time interval. And the master module linearly adjusts the total current's amplitude and/or the plurality of illuminating elements' respective current ratios.

In one example, the examining module detects a first-time cutoff state on the on/off switch. And the master module correspondingly adjusts the plurality of illuminating units' luminance and/or color temperature to be consistent with respective previously-stored parameters.

In one example, the examining module counts a lasting time interval of occurrence of the on/off switch's cutoff state. And the master module correspondingly and cyclically adjusts the illuminating module's total current's amplitude.

In one example, upon the examining module's detects that the lasting time interval of the on/off switch's cutoff state exceeds a first predetermined time interval, the master module restores the illuminating module's luminance back to where right before the examining module starts counting the lasting time interval.

In one example, when upon the examining module's detects that the lasting time interval of the on/off switch's cutoff state fails to exceed a first predetermined time interval, the master module locks an instant total current to the illuminating module, and the examining module recounts the lasting time interval of the on/off switch's state change.

In one example, the master module adjusts current ratios among the plurality of illuminating units within a second predetermined time interval right after the examining module recounts the lasting time interval of the on/off switch's state change.

In one example, when the recounted lasting time interval exceeds the second predetermined time interval, the master module restores the illuminating module's color temperature back to where right before the examining module starts counting the lasting time interval.

In one example, the examining module detects the on/off switch's state change upon beginning of the second predetermined time interval. When the examining module detects occurrence of a state change on the on/off switch within the second predetermined time interval, the master module instantly locks the plurality of illuminating units' respective current ratios.

The present disclosure also aims at disclosing a luminance adjusting method for an illuminating system. In the luminance adjusting method, first, whether an on/off switch of the illuminating system is switched off and whether the on/off switch's cutoff duration lasts over a first predetermined time interval, are detected. Second, a pulse-width modulation signal is generated upon detecting that the on/off switch's cutoff duration fails to last over the first predetermined time interval. Third, a total current forwarded to and current ratios among a plurality of illuminating elements of the illuminating system, are adjusted according to the pulse-width modulation signal.

In one example, first, a lasting time interval of occurrence of the on/off switch's cutoff state is counted. Second, an instant total current to the illuminating module is counted, and the lasting time interval of the on/off switch's state change is recounted when the lasting time interval of the on/off switch's cutoff state fails to exceed the first predetermined time interval. Third, the on/off switch's state change is detected upon beginning of the second predetermined time interval. Fourth, the plurality of illuminating units' respective current ratios are instantly locked upon detecting the state change on the on/off switch within the second predetermined time interval.

DETAILED DESCRIPTION

As mentioned above, the present disclosure discloses an illuminating system that enables its user to adjust its luminance by using a conventional on/off light switch.

Figure 1:
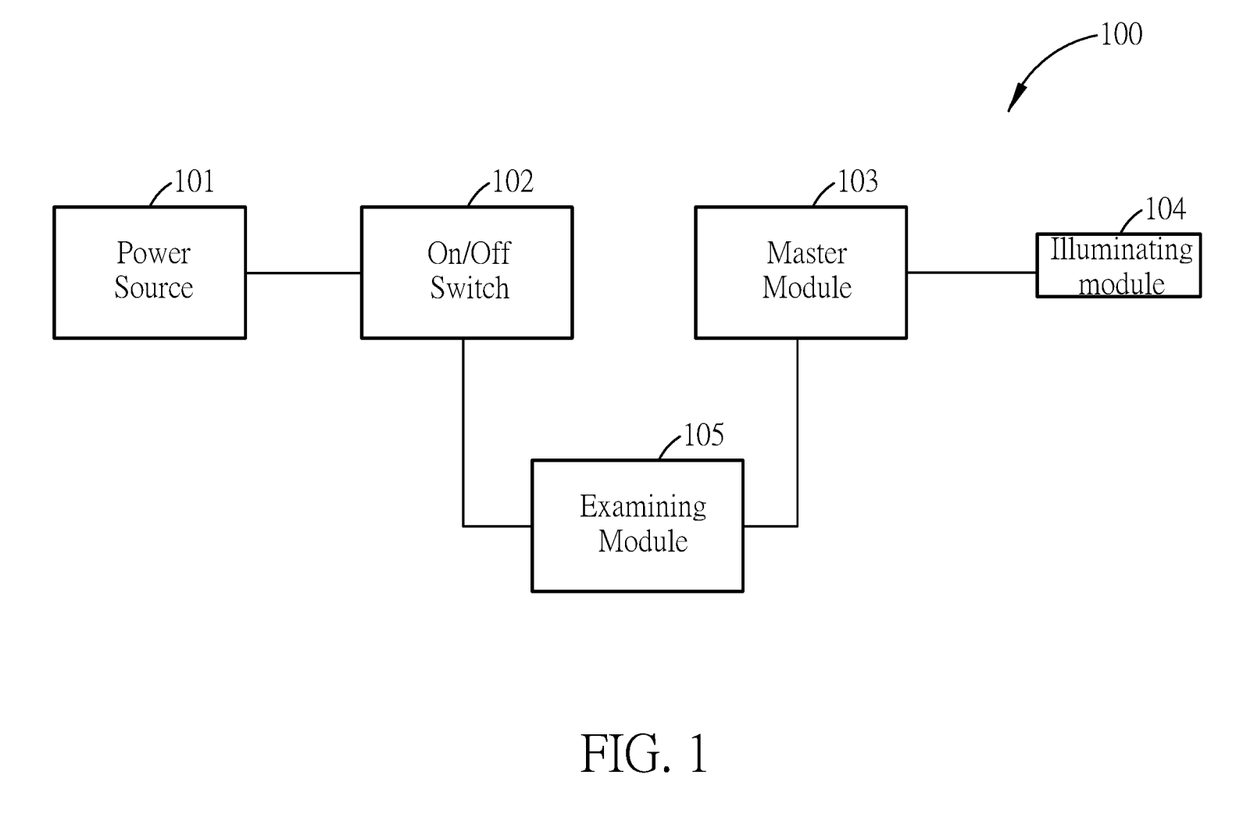
FIG. 1 illustrates an illuminating system capable adjusting its luminance via a conventional on/off light switch according to one embodiment of the present disclosure.

FIG. 1 illustrates an illuminating system 100 capable adjusting its luminance via a conventional on/off light switch according to one embodiment of the present disclosure. In one example, the illuminating system 100 includes a power source 101, an on/off switch 102, a master module 103, a plurality of illuminating elements 104, and an examining module 105.

The on/off switch 102 is electrically coupled to the power source 101. Also, the on/off switch 102 receives power from the power source 101, which may be an AC power source, for powering up the illuminating system 100's other components upon being switched on.

The master module 103 is electrically coupled to the on/off switch 102, the plurality of illuminating components 104, and the examining module 105. In addition, the examining module 105 is electrically coupled to the on/off switch 102.

The examining module 105 continuously or periodically detects the on/off switch 102's on/off state. Upon detecting that the on/off switch 102 is switched on for less than a predetermined time interval, the examining module 105 generates a corresponding adjust signal to the master module 103. In response, the master module 103 linearly adjusts a total current forwarded to the plurality of illuminating elements 104 and adjusts current ratios among the illuminating elements 104. Such that the master module 103 in turn respectively controls the illuminating elements 104's luminance that may be of partially or totally different using a constant total current. In some examples, the illuminating elements 104 respectively have different color temperatures. Therefore, the master module 103 respectively controls the illuminating elements 104's color temperatures by adjusting respective current ratios. And the illuminating elements 104 correspondingly generate a desired and adjusted total color temperature.

In summary, based on simply detecting the on/off switch's short-term on/off state, the illuminating system 100's luminance and/or color temperature can be adjusted. More specifically, without using other complicated remote controller or specifically-designed hardware control device, a user can still use a standard on/off switch to adjust (and to even fine-tune) the illuminating system 100's luminance and/or color temperature. Such that the illuminating system 100 significantly reduces a cost for performing its adjustment in its luminance and/or color temperature.

In some examples, the plurality of illuminating elements 104 are electrically coupled in series. Also, the plurality of illuminating elements 104 may be implemented using light-emitting diodes (LED).

In some examples, the examining module 105 is designed to set the predetermined time interval to be two seconds, which will be globally used for the following explanations but should not be limited in other examples of the present disclosure. In aspect of a common user behavior, the user may quickly flip the on/off switch 102 for three or more times to indicate his/her intention to adjust the illuminating system 100's luminance.

In detail, when the user triggers to switch off the on/off switch 102 in less than two seconds for the first time, and under the examining module 105's control, the master module 103's total current goes low to high and then to low in a smooth manner. That is, the examining module 105 renders master module 103 to initiate a first smooth period for smoothly adjusting the total current. Exemplarily, the first smooth period lasts two or three periods, or lasts even more periods in other examples.

Then, if the user triggers to switch off the on/off switch 102 in less than two seconds during the first smooth period (i.e., triggers the on/off switch for the second time), under the examining module 105's manipulation, the master module 103 locks its output total current. Else, if the user switches off the on/off switch 102 for more than two seconds during the first smooth period (i.e., exceeds the predetermined time interval), the examining module 105 renders the master module 103 to restore its luminance utilized before the first time when the user triggers the on/off switch 102 to switch off.

Right after the master module 103 locks its output total current during the first smooth period, if the user triggers to switch off the on/off switch 102 in less than two seconds for the third time, the examining module 105 renders the master module 103 to repeat its operation during the first smooth period, i.e., to initiate a second smooth period. And, during the second smooth period, if the examining module 105 again detects that the user triggers to switch off the on/off switch 102 in less than two seconds (i.e., for the fourth time), the examining module 105 commands the master module 103 to lock its current total output current. Similarly, during the second smooth period, if the user switches off the on/off switch 102 for more than two seconds during the second smooth period (i.e., exceeds the predetermined time interval), the examining module 105 renders the master module 103 to restore its luminance utilized right before the third time when the user triggers the on/off switch 102 to switch off.

In this way, the user is free to adjust the illuminating system 100's luminance and/or color temperature by simple and rapidly flips on its on/off switch 102.

In some examples, the master module 103 includes at least one of a voltage boost circuit, a voltage buck circuit, a voltage buck-boost converter, and a voltage flyback circuit. Moreover, anyone of the voltage boost circuit, the voltage buck circuit, the voltage buck-boost converter, and the voltage flyback circuit can aid the master module 103 in the adjustment of its output total current and of the illuminating elements 104' respective current ratios. Such that the illuminating system 100's luminance and/or color temperature can be adequately adjusted.

Figure 2:
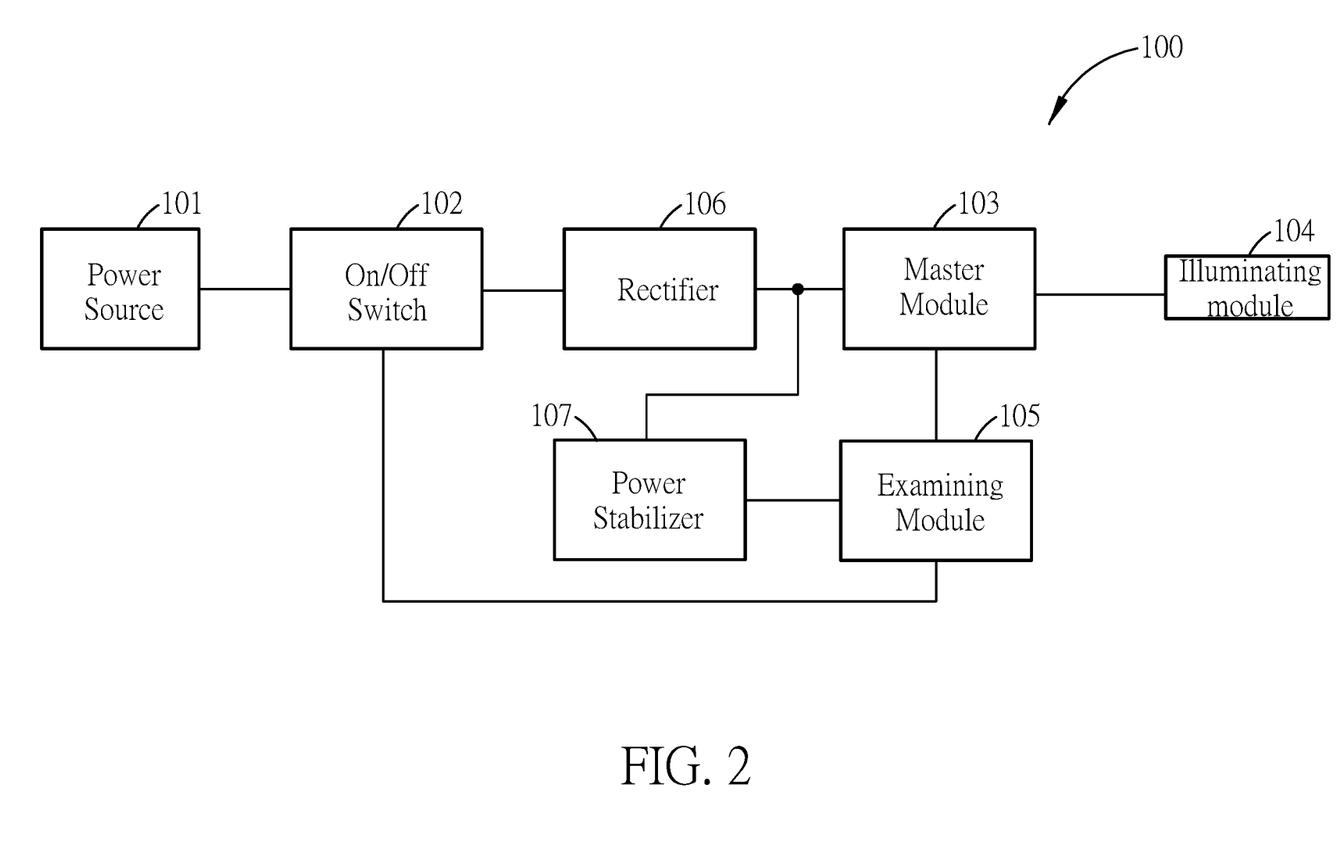
FIG. 2 illustrates another example of the illuminating system shown in FIG. 1.

FIG. 2 illustrates another example of the illuminating system 100 shown in FIG. 1. Specifically, in comparison to FIG. 1, the illuminating system 100 further includes a rectifier 106 and a power stabilizer 107.

The rectifier 106 is electrically coupled to the on/off switch 102 and the master module 103. In addition, the rectifier 106 rectifies the power source 101's output power that may be an AC power.

The power stabilizer 107 is electrically coupled to the examining module 105, the master module 103 and the rectifier 106. Besides, the power stabilizer 107 stabilizes a rectified power from the rectifier 106 for stably powering up both the master module 103 and the examining module 105.

With the aid of the rectifier 106 and the power stabilizer 107, the illuminating system 100 significantly reduces its wasted power consumption with respect to the power source 101's output power.

Figure 3:
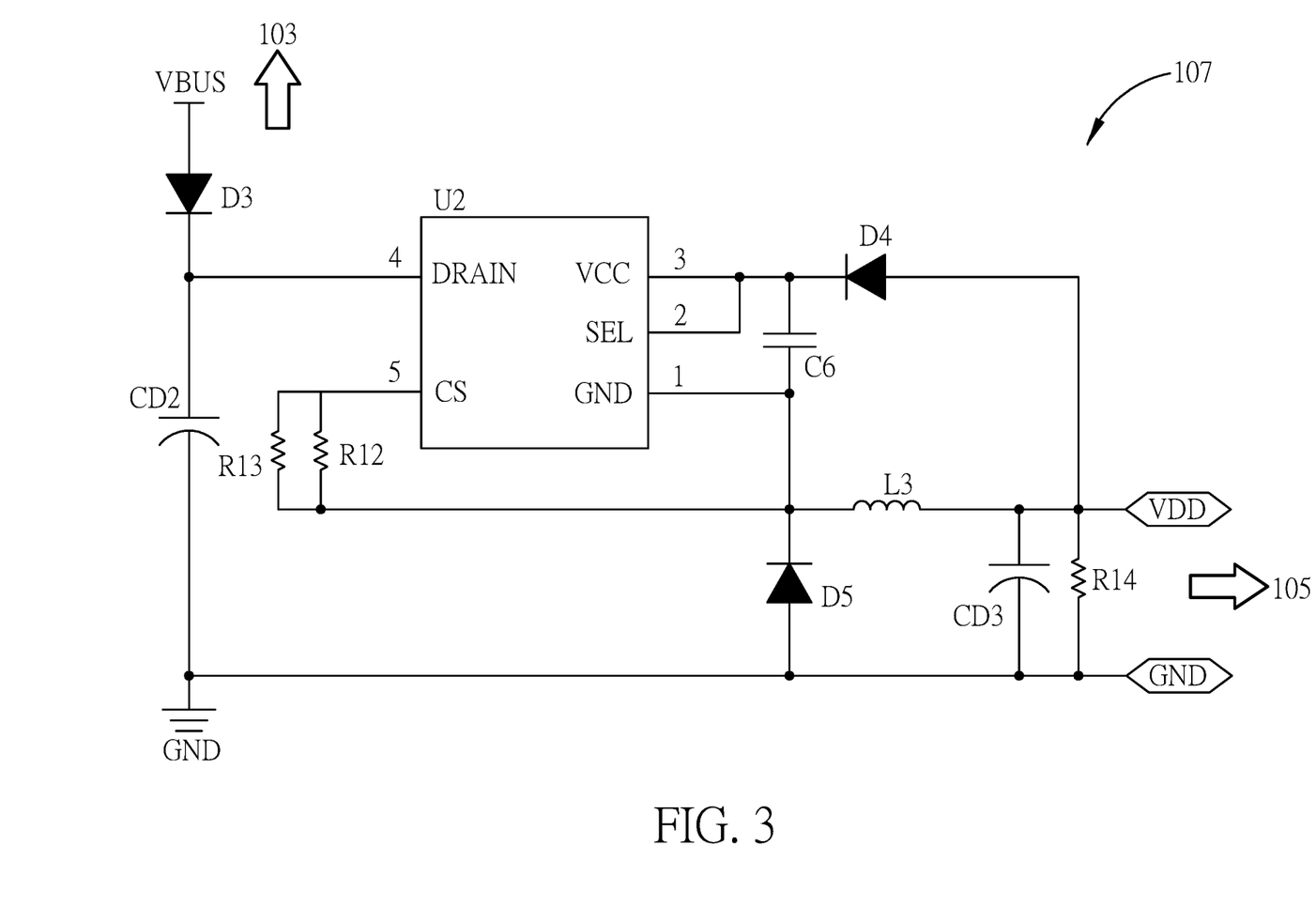
FIG. 3 illustrates an exemplary circuit diagram of the power stabilizer shown in FIG. 2.

FIG. 3 illustrates an exemplary circuit diagram of the power stabilizer 107 shown in FIG. 2. The power stabilizer 107 includes a third diode D3, a fourth diode D4, a fifth diode D5, a second stabilizing capacitor CD2, a third stabilizing capacitor CD3, a third inductor L3, a twelfth resistor R12, a thirteen resistor R13, a fourteenth resistor R14, a sixth capacitor C6, and a switch power chip U2.

The third diode D3 has a positive terminal electrically coupled to the master module 103. And the third diode D3 has a negative terminal electrically coupled to the second stabilizing capacitor CD2's first terminal and the power chip U2's enable terminal DRAN. The twelfth resistor R12 is electrically coupled to the thirteenth resistor R13 in parallel. Besides, the twelfth resistor R12 has a first terminal electrically coupled to the power chip U2's chip select terminal CS. The fourth diode D4 has a negative terminal electrically coupled to the sixth capacitor C6's first terminal and the power chip U2's power terminal VCC. The sixth capacitor C6's second terminal is electrically coupled to the twelfth resistor R12's second terminal, the thirteenth resistor R13's second terminal, the fifth diode D5's negative terminal and the third inductor L3's first terminal. Moreover, the fourth diode D4 has a positive terminal electrically coupled to the third inductor L3's second terminal, the third stabilizing capacitor CD3's first terminal, the fourteenth resistor R14's first terminal, and the examining module 105. The second stabilizing capacitor CD2 has a second terminal electrically coupled to the fifth diode D5's positive terminal, the third stabilizing capacitor CD3's second terminal, the fourteenth resistor R14's second terminal, and ground.

Figure 4:
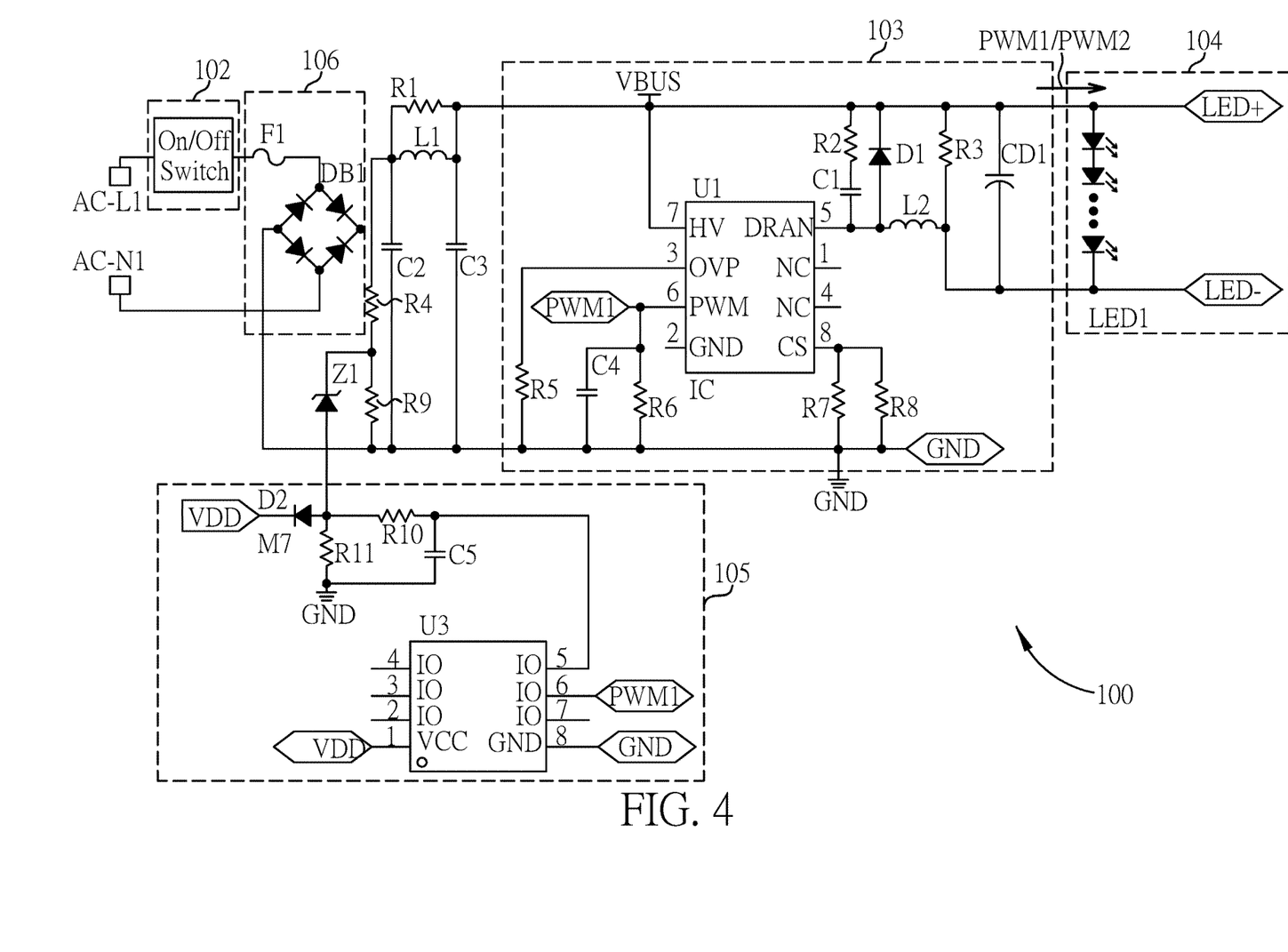
FIG. 4 illustrates an exemplary circuit diagram of the illuminating system shown in FIG. 2 according to a first example.

FIG. 4 illustrates an exemplary circuit diagram of the illuminating system 100 shown in FIG. 2 according to a first example.

The master module 103 includes a master chip U1, a second resistor R2, a third resistor R3, a fifth resistor R5, a sixth resistor R6, a seventh resistor R7, an eighth resistor R8, a first capacitor C1, a fourth capacitor C4, a first stabilizing capacitor CD1, a first diode D1 and a second inductor L2.

The second resistor R2 has a first terminal electrically coupled to the first diode D1's negative terminal, the third resistor R3's first terminal and the first stabilizing capacitor CD1's first terminal. Also, the second resistor R2 has a second terminal electrically coupled to the first capacitor C1's first terminal. And the first capacitor C1 has a second terminal electrically coupled to the first diode D1's positive terminal, the second inductor L2's first terminal, and the master chip U1's enable terminal DRAN. The second inductor L2's second terminal is electrically coupled to the third resistor R3's second terminal. The fifth resistor R5 has a first terminal electrically coupled to the master chip U1's overvoltage protection terminal OVP. The fourth capacitor C4 is electrically coupled to the sixth resistor R6 in parallel. Also, the fourth capacitor C4 has a first terminal electrically coupled to the master chip U1's pulse-width modulation (PWM) terminal PWM for receiving a PWM signal. The seventh resistor R7 is electrically coupled to the eighth resistor R8 in parallel. And the seventh resistor R7 has a first terminal electrically coupled to the master chip U1's chip select terminal CS. The fifth resistor R5 has a second terminal electrically coupled to the sixth resistor R6's second terminal, the seventh resistor R7's second terminal, the eighth resistor R8's second terminal, the fourth capacitor C4's second terminal and ground.

The examining module 105 has a second diode D2, a fifth capacitor C5, a tenth resistor R10, an eleventh resistor R11 and a luminance modulating chip U3.

The second diode D2's negative terminal is electrically coupled to a reference voltage source VDD. And the second diode D2's positive terminal is electrically coupled to the tenth resistor R10's first terminal and the eleventh resistor R11's first terminal. In addition, the tenth resistor R10 has a second terminal electrically coupled to the fifth capacitor C5's first terminal and the luminance modulating chip U3's socket terminal IO. And the eleventh resistor R11's second terminal is electrically coupled to the fifth capacitor C5's second terminal and ground.

The rectifier 106 includes a rectifying bridge DB1.

Figure 5:
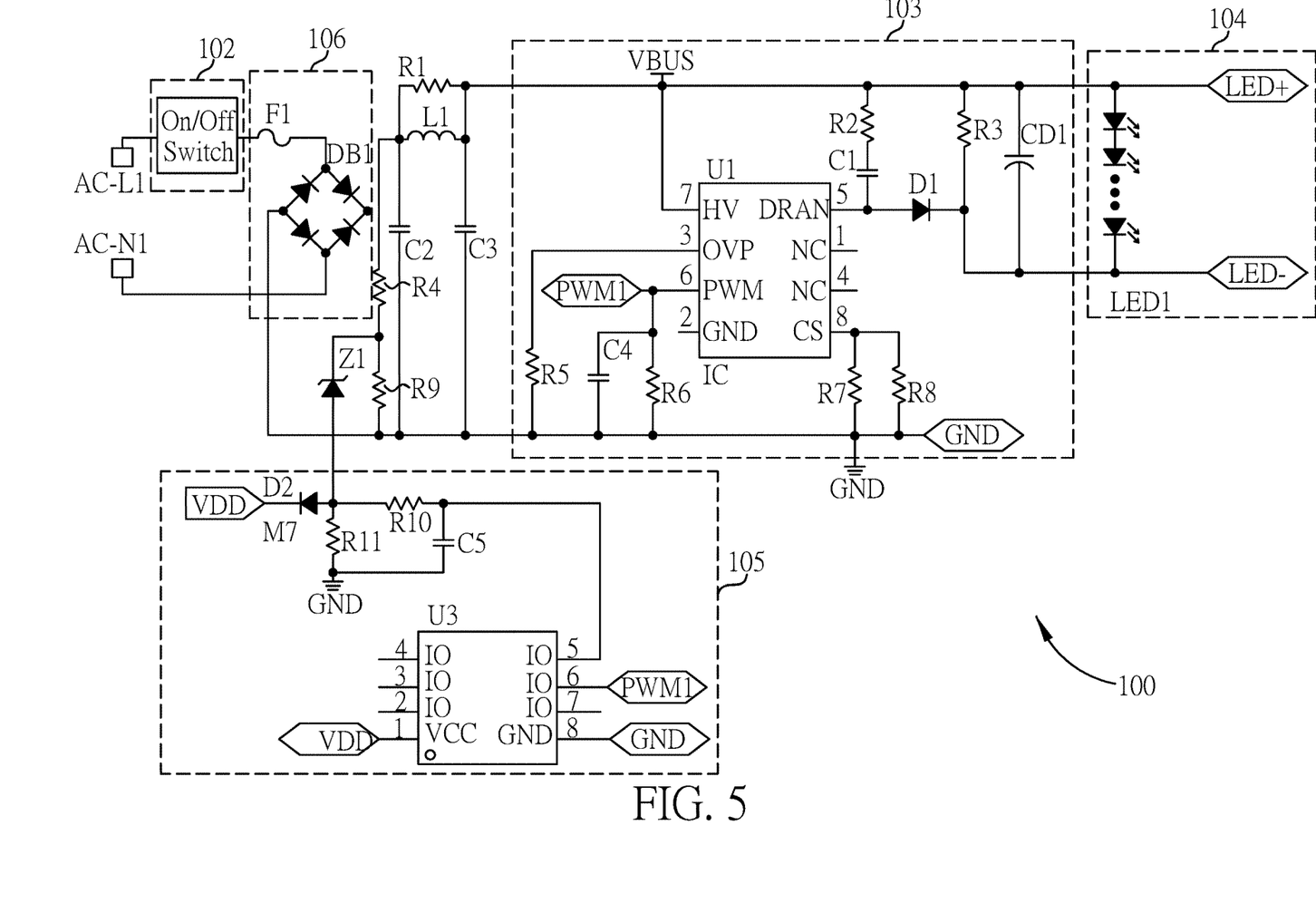
FIG. 5 illustrates another exemplary circuit diagram of the illuminating system shown in FIG. 2 according to a second example.

FIG. 5 illustrates another exemplary circuit diagram of the illuminating system 100 shown in FIG. 2 according to a second example.

In comparison to FIG. 4, the master module 103 does not include the first capacitor C1. Also, the master module 103 has different couplings between the second resistor R2, the third resistor R3, the second inductor L2, the first voltage stabilizing capacitor CD1 and the first diode D1.

The second resistor R2 has a first terminal electrically coupled to the second inductor L2's first terminal, the third resistor R3's first terminal and the first stabilizing capacitor CD1's first terminal. And the second resistor R2 has a second terminal electrically coupled to the master chip U1's high voltage terminal HV. The first diode D1 has a positive terminal electrically coupled to the second inductor L2's first terminal and the master chip U1's enable terminal DRAN. The third resistor R3 has a second terminal electrically coupled to the first diode D1's negative terminal and the first stabilizing capacitor CD1's second terminal.

Figure 6:
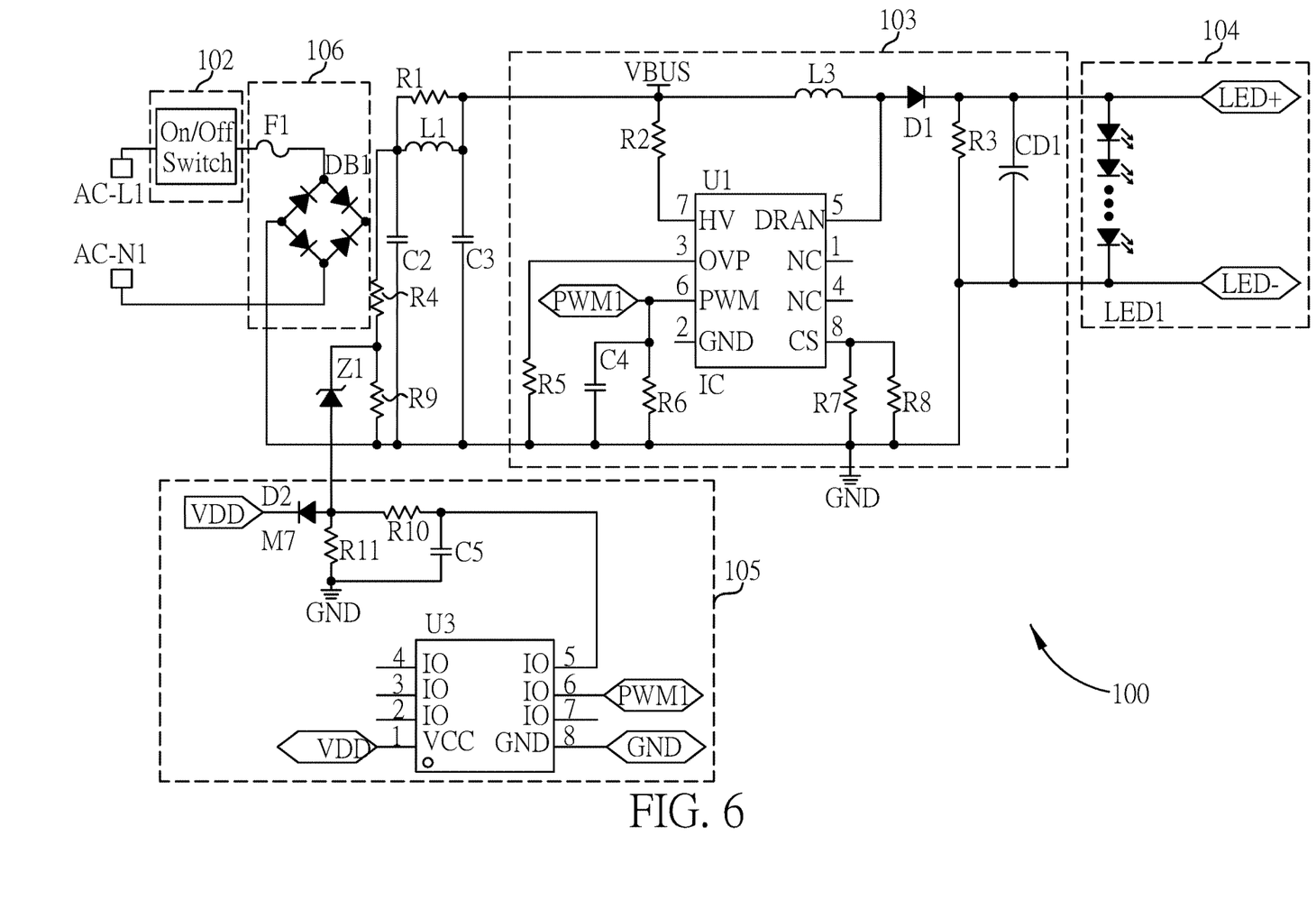
FIG. 6 illustrates still another exemplary circuit diagram of the illuminating system shown in FIG. 2 according to a third example.

FIG. 6 illustrates still another exemplary circuit diagram of the illuminating system 100 shown in FIG. 2 according to a third example.

In comparison to FIG. 4, the master module 103 does not include the first capacitor C1. And the master module 103 has different couplings of the second resistor R2, the third resistor R3, the second inductor L2, the first stabilizing capacitor CD1, and the first diode D1.

The second resistor R2 has a first terminal electrically coupled to the second inductor L2's first terminal. And the second inductor L2 has a second terminal electrically coupled to the first diode D1's positive terminal and the master chip U1's enable terminal DRAN. Also, the first diode D1 has a negative terminal electrically coupled to the third resistor R3's first terminal and the first stabilizing capacitor CD1's first terminal. The second resistor R2 has a second terminal electrically coupled to the master chip U1's high voltage terminal HV. And the third resistor R3 has a second terminal electrically coupled to the first stabilizing capacitor CD1's second terminal and ground.

How the illuminating system 100 works will be described in the following paragraphs based on examples illustrated in FIGS. 1-6.

First, the on/off switch 102 receives an AC power from the power source 101, where the AC power may be of 50 Hz or 60 Hz in some examples. Second, the rectifier 106 (or exemplarily, its rectifying bridge DB1) to transform the AC power into an entirely positive voltage of exemplarily 100 Hz or 120 Hz. Third, the power stabilizer 107 transforms the rectified voltage from the rectifier 106 into a constant-current voltage, and then relays the constant-current voltage to the master module 103 and the examining module 105. Upon detecting a short-term cutoff state on the constant-current voltage, the examining module 105 generates a corresponding PWM signal and relays the PWM signal to the master module 103. Such that the master module 103 adjusts the illuminating module 104's total current's amplitude and/or the illuminating module 104's respective illuminating unit's current ratio with the aid of the PWM signal. Consequently, the illuminating system 100 is capable of adjusting the illuminating module 104's luminance and/or color temperature.

Figure 7:
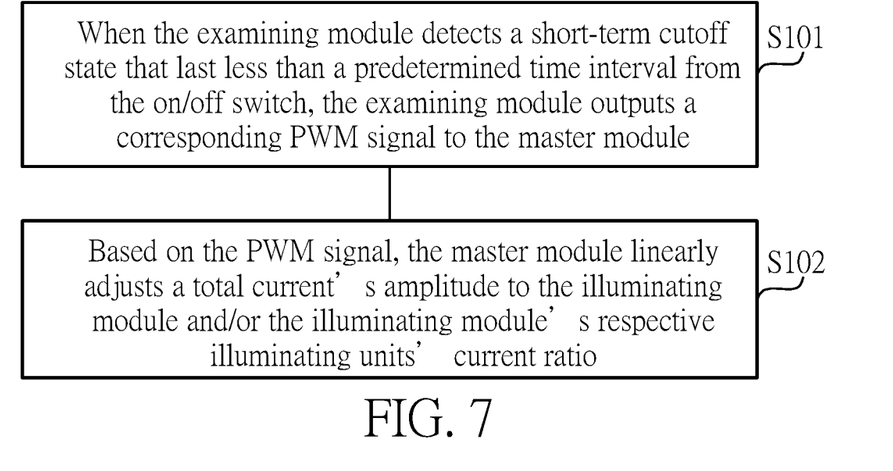
FIG. 7 illustrates a luminance adjusting method's flowchart based on descriptions associated with FIGS. 1-6 according to one example.

FIG. 7 illustrates a luminance adjusting method's flowchart based on descriptions associated with FIGS. 1-6 according to one example. The luminance adjusting method includes the following steps:

Step S101: When the examining module 105 detects a short-term cutoff state that last less than a predetermined time interval from the on/off switch 102, the examining module 105 outputs a corresponding PWM signal to the master module 103.

Step S102: Based on the PWM signal, the master module 103 linearly adjusts a total current's amplitude to the illuminating module 104 and/or the illuminating module 104's respective illuminating units' current ratio. Such that the illuminating module 104 stably illuminates under a constant current.

Specifically, the illuminating module 104 is capable of emitting a spectrum of color temperatures. Therefore, by adjusting the illuminating module 104's respective illuminating unit's current ratio, the illuminating module 104 can adjust its total luminance and/or total color temperature. On top of that, since such adjustments on luminance and/or color temperature are simply based on detecting the on/off switch 102's short-term cutoff state and/or when its cutoff duration lasts over a predetermined time interval, the on/off switch 102 does not require significant modification for implementing the disclosed luminance adjusting method. In other words, the disclosed luminance adjusting method is cost-effective and simple in its implementation.

In some examples, the disclosed luminance adjusting method shown in FIG. 7 includes an additional step: when the examining module 105 detects a first-time cutoff state on the on/off switch 102, in response, the master module 103 adjusts the illuminating module 104's illuminating units' luminance and/or color temperature to be consistent with respective previously-stored parameters. In this way, the master module 103 is prevented from disorder in its adjustment on the illuminating module 104 that may cause the illuminating module 104's sudden change in luminance and/or color temperature.

Figure 8:
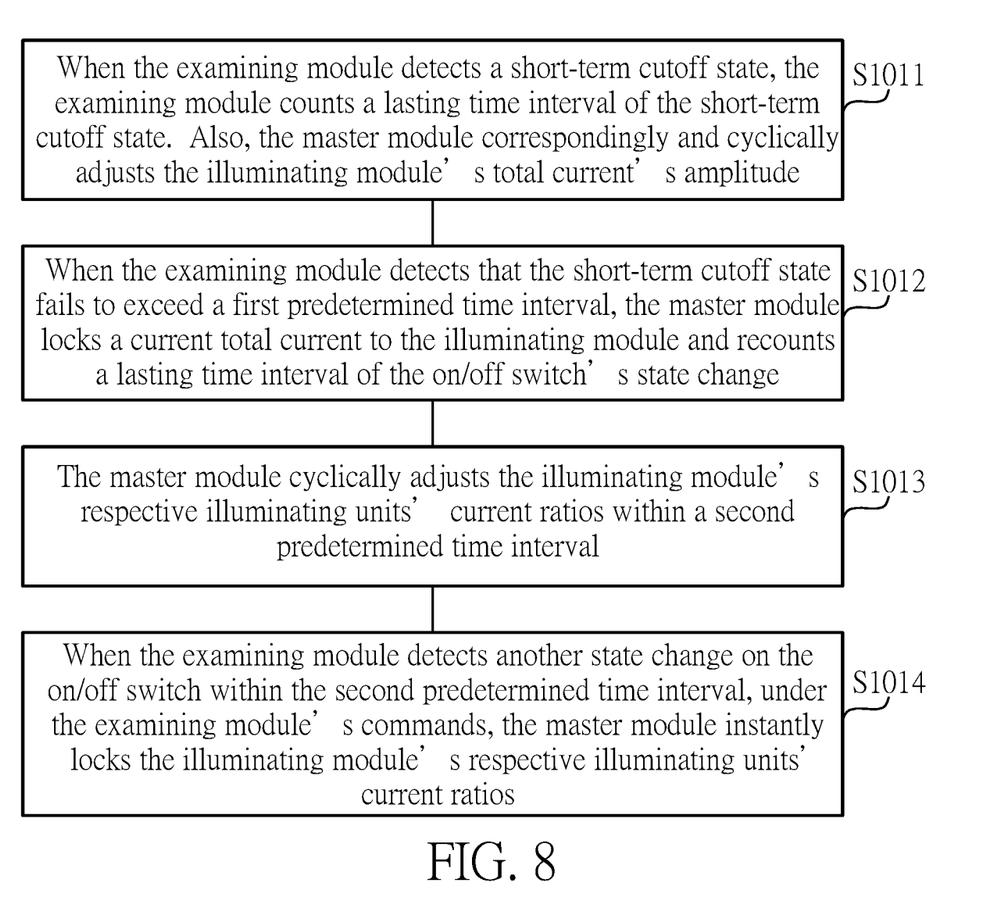
FIG. 8 illustrates specific steps of the Step S101 shown in FIG. 7 according to one example.

FIG. 8 illustrates specific steps of the Step S101 shown in FIG. 7 according to one example.

Step S1011: When the examining module 105 detects a short-term cutoff state, the examining module 105 counts a lasting time interval of the short-term cutoff state. Also, the master module 103 correspondingly and cyclically adjusts the illuminating module 104's total current's amplitude.

Step S1012: When the examining module 105 detects that the short-term cutoff state fails to exceed a first predetermined time interval, i.e., when the on/off switch 102 is switched on before reaching the predetermined time interval, the master module 103 locks a current total current to the illuminating module 104 and recounts a lasting time interval of the on/off switch 102's state change. Else, when the examining module 105 detects that the short-term cutoff state lasts over the first predetermined time interval, the master module 103 restores the illuminating module 104's luminance back to immediately before the short-term cutoff state occurs. The examining module 105 may set the first predetermined time interval according to the illuminating system 100's instant requirements. In some examples, the predetermined time interval ranges between five second to fifteen seconds.

Exemplarily, the master module 103's cyclic adjustment on the illuminating module 104's total current's amplitude during the first predetermined time interval is performed high-to-low or low-to-high for N periods, where N is a positive integer.

In one example, the Step S101 additionally includes:

Step S1013: The master module 103 cyclically adjusts the illuminating module 104's respective illuminating units' current ratios within a second predetermined time interval.

Step S1014: When the examining module 105 detects another state change on the on/off switch 102 within the second predetermined time interval, under the examining module 105's commands, the master module 103 instantly locks the illuminating module 104's respective illuminating units' current ratios, for example, for adjusting the respective illuminating units' color temperatures. Similarly, when the examining module 105 fails to detect another state change on the on/off switch 102 within the second predetermined time interval, the master module 103 restores the illuminating module 104's previous color temperature occurring immediately before the second predetermined time interval begins. Exemplarily, the examining module 105 can dynamically set the second predetermined time interval's duration based on the illuminating system 100's instant requirements, such as between five seconds to fifteen seconds.

Exemplarily, the master module 103's cyclic adjustment on the illuminating module 104's total current's amplitude during the second predetermined time interval is performed high-to-low or low-to-high for M periods, where M is a positive integer.

Figure 9:
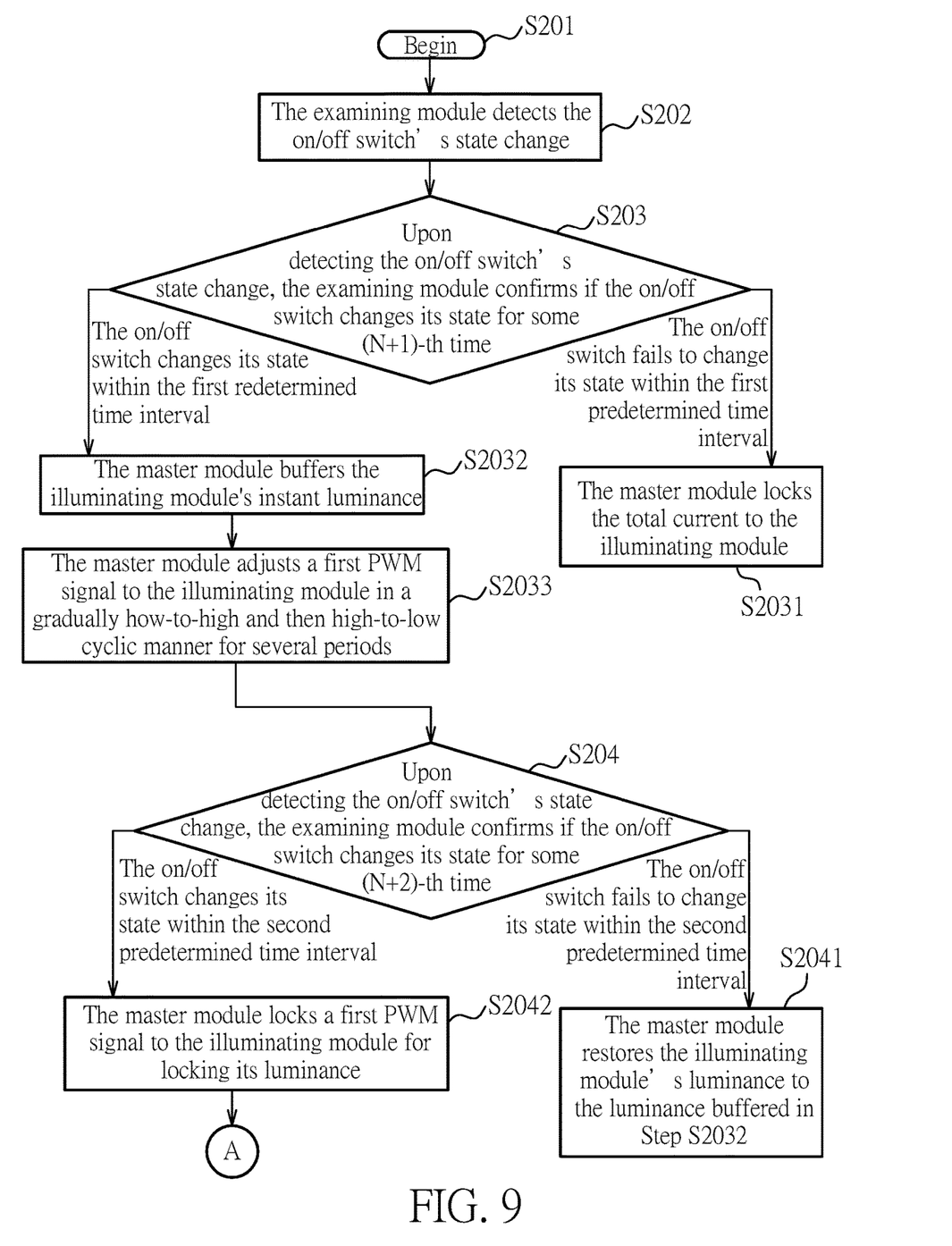
FIGS. 9-10 illustrate an exemplary flowchart of the disclosed luminance adjusting method according to one example.
Figure 10:
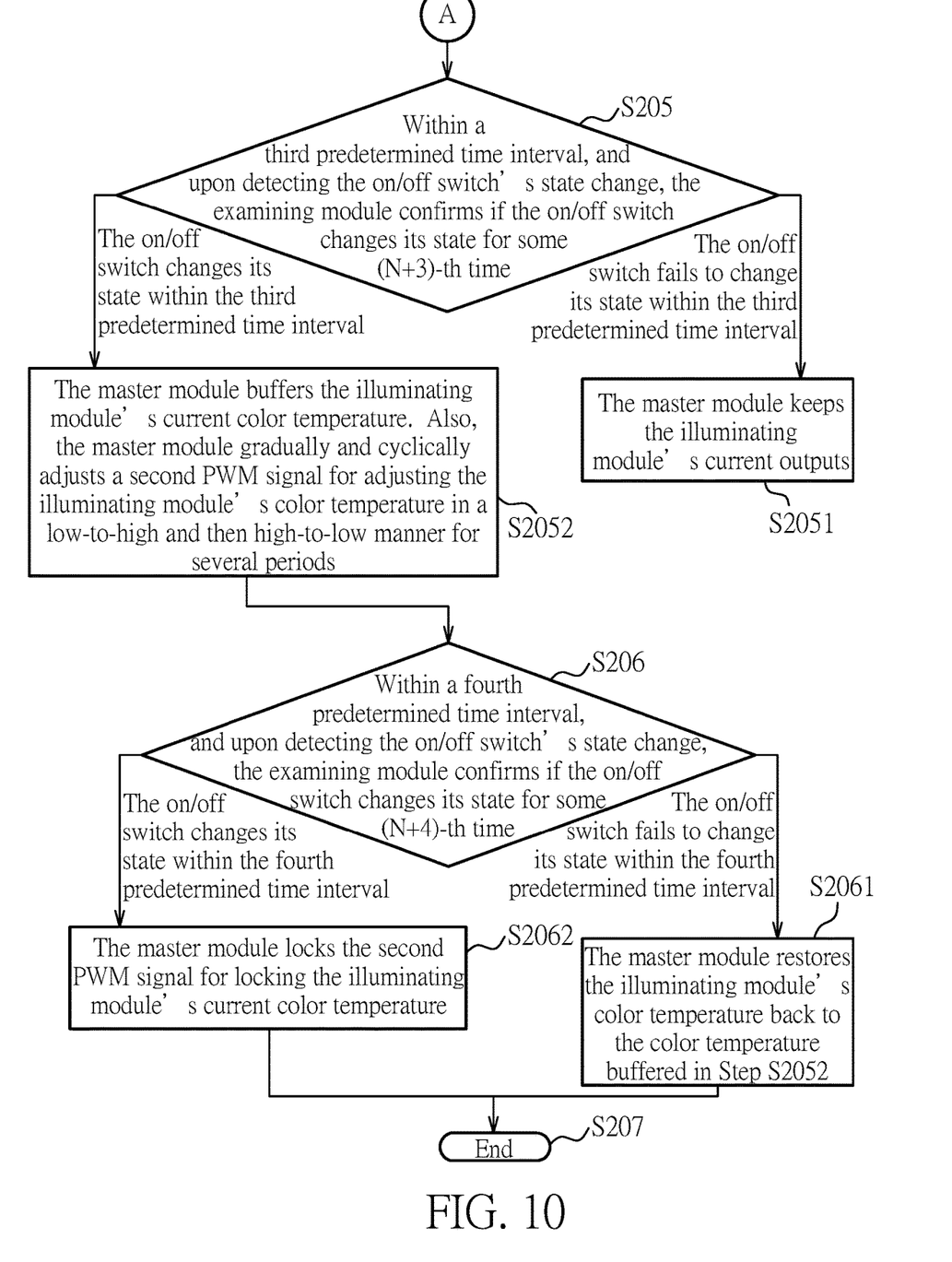

FIGS. 9-10 illustrate an exemplary flowchart of the disclosed luminance adjusting method according to one example.

Step S201: Begin.

Step S202: The examining module 105 detects the on/off switch 102's state change.

Step S203: Upon detecting the on/off switch 102's state change, the examining module 105 confirms if the on/off switch 102 changes its state for some first time (or (N+1)-th time) (i.e., within the first predetermined time interval). If the examining module 105 confirms that the on/off switch 102 fails to change its state within the first predetermined time interval, go to Step S2031. Else, if the examining module 105 confirms that the on/off switch 102 changes its state within the first predetermined time interval, go to Step S2032.

Step S2031: The master module 103 locks the total current to the illuminating module 104.

Step S2032: The master module 103 buffers the illuminating module 104's instant luminance.

Step S2033: The master module 103 adjusts a first PWM signal to the illuminating module 104 in a gradually how-to-high and then high-to-low cyclic manner for several periods (i.e., the second predetermined time interval), for example, three periods.

Step S204: Upon detecting the on/off switch 102's state change, the examining module 105 confirms if the on/off switch 102 changes its state for some second time (or (N+2)-th time) (i.e., within the second predetermined time interval). If the examining module 105 confirms that the on/off switch 102 fails to change its state within the second predetermined time interval, go to Step S2041. Else, if the examining module 105 confirms that the on/off switch 102 changes its state within the second predetermined time interval, go to Step S2042.

Step S2041: The master module 103 restores the illuminating module 104's luminance to the luminance buffered in Step S2032.

Step S2042: The master module 103 locks a first PWM signal PWM1 to the illuminating module 104 for locking its luminance.

Step S205: Within a third predetermined time interval, and upon detecting the on/off switch 102's state change, the examining module 105 confirms if the on/off switch 102 changes its state for some third time(or (N+3)-th time). If the examining module 105 confirms that the on/off switch 102 fails to change its state within the third predetermined time interval, go to Step S2051. Else, if the examining module 105 confirms that the on/off switch 102 changes its state within the third predetermined time interval, go to Step S2052.

Step S2051: The master module 103 keeps the illuminating module 104's current outputs.

Step S2052: The master module 103 buffers the illuminating module 104's current color temperature. Also, the master module 103 gradually and cyclically adjusts a second PWM signal PWM2 for adjusting the illuminating module 104's color temperature in a low-to-high and then high-to-low manner for several periods, e.g., three periods.

Step S206: Within a fourth predetermined time interval, and upon detecting the on/off switch 102's state change, the examining module 105 confirms if the on/off switch 102 changes its state for some fourth time(or (N+4)-th time). If the examining module 105 confirms that the on/off switch 102 fails to change its state within the fourth predetermined time interval, go to Step S2061. Else, if the examining module 105 confirms that the on/off switch 102 changes its state within the fourth predetermined time interval, go to Step S2062.

Step S2061: The master module 103 restores the illuminating module 104's color temperature back to the color temperature buffered in Step S2052.

Step S2062: The master module 103 locks the second PWM signal PWM2 for locking the illuminating module 104's current color temperature.

Step S207: End.

It is noted that the first, second, third and fourth predetermined interval may be the same, partially different or entirely different. The examining module 105 may dynamically adjust them according to its instant requirements.

With the aid of the illuminating system 100 and the luminance adjusting method disclosed in the present disclosure, a user can simply adjust indoor luminance and/or color temperature by simply (and rapidly if necessary) flipping on an indoor on/off switch for several times. More important of all, such simple adjustment on luminance and/or color temperature does not require any complicated hardware for facilitating the user in his/her control behavior, instead, just a simple indoor on/off switch is used in the present disclosure. In other words, the disclosed illuminating system and luminance adjusting method are cost-effective in comparison to conventional ways.

The invention claimed is:

1. An illuminating system, comprising:
   a power source, configured to supply power;
   an on/off switch, electrically coupled to the power source, and configured to switch on or switch off the power from the power source;
   an examining module, electrically coupled to the on/off switch, configured to detect whether the on/off switch is switched off and whether the on/off switch's switched-off state lasts over a predetermined time interval, and configured to generate an adjust signal corresponding to a result of detecting the on/off switch;
   an illuminating module that comprises a plurality of illuminating elements; and
   a master module, electrically coupled to the on/off switch, the examining module and the plurality of illuminating elements, configured to adjust a total current forwarded to and current ratios among the plurality of illuminating elements according to the adjust signal.

2. The illuminating system of claim 1, further comprising:
   a rectifier, electrically coupled to the on/off switch and the master module, and configured to rectify the power from the power source; and
   a power stabilizer, electrically coupled to the examining module, the master module and the examining module, and configured to stabilize a rectified power from the rectifier for stably powering up the master module and the examining module.

3. The illuminating system of claim 2, wherein the power stabilizer comprises:
   a switch power chip;
   a third diode, having a positive terminal electrically coupled to the master module, and having a negative terminal electrically coupled to the power chip's enable terminal;
   a fourth diode, having a negative terminal electrically coupled to the power chip's power terminal, and having a positive terminal electrically coupled to the examining module;
   a fifth diode, having a negative terminal electrically coupled to the power chip's ground terminal, and having a positive terminal electrically coupled to ground;
   a second stabilizing capacitor, having a first terminal coupled to the third diode's negative terminal, and having a second terminal electrically coupled to the fifth diode's positive terminal;
   a third stabilizing capacitor, having a first terminal electrically coupled to the fourth diode's positive terminal, and having a second terminal electrically coupled to the fifth diode's positive terminal;
   a sixth capacitor, having a first terminal electrically coupled to the fourth diode's negative terminal, and having a second terminal electrically coupled to the fifth diode's negative terminal; and
   a third inductor, having a first terminal electrically coupled to the fifth diode's negative terminal, and having a second terminal electrically coupled to the fourth diode's positive terminal.

4. The illuminating system of claim 3, wherein the power stabilizer further comprises:
   a twelfth resistor, having a first terminal electrically coupled to the power chip's chip select terminal, and having a second terminal electrically coupled to the fifth diode's negative terminal;
   a thirteenth resistor, electrically coupled to the twelfth resistor in parallel; and
   a fourteenth resistor, electrically coupled to the third stabilizing capacitor in parallel.

5. The illuminating system of claim 2, wherein the master module comprises:
   a master chip;
   a fourth capacitor, having a first terminal electrically coupled to the master chip's pulse-width modulation terminal, and having a second terminal electrically coupled to ground;
   a fifth resistor, having a first terminal electrically coupled to the master chip's overvoltage protection terminal, and having a second terminal electrically coupled to the fourth capacitor's second terminal;
   a sixth resistor, electrically coupled to the fourth capacitor in parallel;

a seventh resistor, having a first terminal electrically coupled to the master chip's chip select terminal, and having a second terminal electrically coupled to the fourth capacitor's second terminal; and an eighth resistor, electrically coupled to the seventh resistor in parallel.

6. The illuminating system of claim 5, wherein the master module further comprises:

a first capacitor, having a first terminal electrically coupled to the master chip's enable terminal;

a second resistor, having a first terminal electrically coupled to the first capacitor's second terminal, and having a second terminal electrically coupled to the power stabilizer;

a first diode, having a first terminal electrically coupled to the first capacitor's first terminal, and having a second terminal electrically coupled to the second resistor's second terminal;

a second inductor, having a first terminal electrically coupled to the first capacitor's first terminal, and having a second terminal electrically coupled to the illuminating module;

a third resistor, having a first terminal electrically coupled to the second inductor's second terminal, and having a second terminal electrically coupled to the first diode's negative terminal; and a first stabilizing capacitor, electrically coupled to the third resistor in parallel.

7. The illuminating system of claim 5, wherein the master module further comprises:

a first capacitor, having a first terminal electrically coupled to the master chip's enable terminal;

a second resistor, having a first terminal electrically coupled to the first capacitor's second terminal, and having a second terminal electrically coupled to the power stabilizer;

a first diode, having a positive terminal electrically coupled to the first capacitor's first terminal, and having a negative terminal electrically coupled to the illuminating module;

a third resistor, having a first terminal electrically coupled to the first diode's negative terminal, and having a second terminal electrically coupled to the second resistor's second terminal; and a first stabilizing capacitor, electrically coupled to the third resistor in parallel.

8. The illuminating system of claim 5, wherein the master module further comprises:

a second resistor, having a first terminal electrically coupled to the master chip's high voltage terminal, and having a second terminal electrically coupled to the power stabilizer;

a third inductor, having a first terminal electrically coupled to the master chip's enable terminal, and having a second terminal electrically coupled to the second resistor's second terminal;

a first diode, having a positive terminal electrically coupled to the third inductor's first terminal;

a third resistor, having a first terminal electrically coupled to the first diode's negative terminal and the illuminating module, and having a second terminal electrically coupled to the seventh resistor's second terminal; and a first stabilizing capacitor, electrically coupled to the third resistor in parallel.

9. The illuminating system of claim 2, wherein the examining module comprises:

a second diode, having a negative terminal electrically coupled to a reference voltage source;

a luminance modulating chip;

a tenth resistor, having a first terminal electrically coupled to the luminance modulating chip's socket terminal, and having a second terminal electrically coupled to the second diode's positive terminal;

an eleventh resistor, having a first terminal electrically coupled to the rectifier and the second diode's positive terminal, and having a second terminal electrically coupled to ground; and a fifth capacitor, having a first terminal electrically coupled to the tenth resistor's second terminal, and having a second terminal electrically coupled to the eleventh resistor's second terminal.

10. The illuminating system of claim 2, wherein the rectifier comprises a rectifying bridge.

11. The illuminating system of claim 1, wherein the examining module is further configured to generate a pulse-width modulation signal upon detecting that the on/off switch's cutoff duration fails to last over the predetermined time interval, and the master module is further configured to linearly adjust the total current's amplitude and/or the plurality of illuminating elements' respective current ratios.

12. The illuminating system of claim 11, wherein the examining module is further configured to detect a first-time cutoff state on the on/off switch, and the master module is configured to correspondingly adjust the plurality of illuminating units' luminance and/or color temperature to be consistent with respective previously-stored parameters.

13. The illuminating system of claim 1, wherein the examining module is further configured to count a lasting time interval of occurrence of the on/off switch's cutoff state, and the master module is further configured correspondingly and cyclically adjust the illuminating module's total current's amplitude.

14. The illuminating system of claim 13, wherein upon the examining module's detecting that the lasting time interval of the on/off switch's cutoff state exceeds a first predetermined time interval, the master module is further configured to restore the illuminating module's luminance back to where right before the examining module starts counting the lasting time interval.

15. The illuminating system of claim 13, wherein when upon the examining module's detecting that the lasting time interval of the on/off switch's cutoff state fails to exceed a first predetermined time interval, the master module is further configured to lock an instant total current to the illuminating module, and the examining module is further configured to recount the lasting time interval of the on/off switch's state change.

16. The illuminating system of claim 15, wherein the master module is further configured to adjust current ratios among the plurality of illuminating units within a second predetermined time interval right after the examining module recounts the lasting time interval of the on/off switch's state change.

17. The illuminating system of claim 15, wherein when the recounted lasting time interval exceeds the second predetermined time interval, the master module is further configured to restore the illuminating module's color temperature back to where right before the examining module starts counting the lasting time interval.

18. The illuminating system of claim 17, wherein the examining module is further configured to detect the on/off switch's state change upon beginning of the second predetermined time interval;

wherein when the examining module detects occurrence of a state change on the on/off switch within the second predetermined time interval, the master module is further configured to instantly lock the plurality of illuminating units' respective current ratios.

19. A luminance adjusting method for an illuminating system, comprising:
   detecting whether an on/off switch of the illuminating system is switched off and whether the on/off switch's cutoff duration lasts over a first predetermined time interval;
   generating a pulse-width modulation signal upon detecting that the on/off switch's cutoff duration fails to last over the first predetermined time interval; and
   adjusting a total current forwarded to and current ratios among a plurality of illuminating elements of the illuminating system according to the pulse-width modulation signal.

20. The method of claim 19, further comprising:
   counting a lasting time interval of occurrence of the on/off switch's cutoff state;
   locking an instant total current to the illuminating module and recounting the lasting time interval of the on/off switch's state change when the lasting time interval of the on/off switch's cutoff state fails to exceed the first predetermined time interval;
   detecting the on/off switch's state change upon beginning of the second predetermined time interval; and
   instantly locking the plurality of illuminating units' respective current ratios upon detecting the state change on the on/off switch within the second predetermined time interval.

* * * * *